(12) United States Patent
Mandella

(10) Patent No.: US 6,181,478 B1
(45) Date of Patent: Jan. 30, 2001

(54) ELLIPSOIDAL SOLID IMMERSION LENS

(76) Inventor: Michael Mandella, 10193 Parkwood Dr., #2, Cupertino, CA (US) 95014

(*) Notice: Under 35 U.S.C. 154(b), the term of this patent shall be extended for 0 days.

(21) Appl. No.: 09/354,841

(22) Filed: Jul. 16, 1999

(51) Int. Cl.[7] .............................. G02B 3/00; G02B 21/02; G02B 3/02
(52) U.S. Cl. ..................... 359/642; 359/656; 359/708; 359/712
(58) Field of Search ...................... 359/648, 642, 359/656, 657, 658, 659, 660, 661, 708, 712

(56) References Cited

U.S. PATENT DOCUMENTS 5,978,139 * 11/1999 Hatakoshi et al. .................. 359/565
5,991,098 * 11/1999 Oareto ................................. 359/718
6,055,076 * 4/2000 Takahashi et al. ..................... 359/16

* cited by examiner

Primary Examiner—Georgia Epps
Assistant Examiner—Saeed Seyrafi
(74) Attorney, Agent, or Firm—Lumen Intellectual Property Services

(57) ABSTRACT

A solid immersion lens (SIL) of refractive index n having an ellipsoidal surface portion defining a geometrical ellipsoid with geometrical foci $F_1$, $F_2$ along a major axis of length M. The ellipsoidal SIL (or ESIL) has an interface surface which is preferably flat and passes near or through the second geometrical focus $F_2$. The geometrical foci $F_1$, $F_2$ are separated by a distance $S=M/n$, such that a collimated light beam propagating along the major axis M and entering the ESIL through the ellipsoidal surface portion converges to a focus substantially at the second geometrical focus $F_2$. The ESIL finds application in optical systems such as microscopes and optical recording systems.

29 Claims, 5 Drawing Sheets

ELLIPSOIDAL SOLID IMMERSION LENS

FIELD OF INVENTION

This invention generally relates to ellipsoidal solid immersion lenses and optical systems using such solid immersion lenses.

BACKGROUND OF THE INVENTION

In many optical systems and applications, such as near-field microscopy, imaging, photolithography and optical storage it is important to reduce the spot size and thus obtain higher definition or resolution. The spot size of an optical system, e.g., an optical storage system, is commonly defined as the distance between half power points. This distance is determined by diffraction to be approximately $\lambda/(2 \cdot NA)$, where $\lambda$ is the free space wavelength of the light used and NA is the numerical aperture of the objective lens focusing the light beam. NA is defined as $NA = n \sin(\theta)$, where $\theta$ is the half cone angle of the focused light rays and n is the index of refraction of the medium in which $\theta$ is measured.

One way to improve the definition is to work at shorter wavelengths $\lambda$, e.g., in the green or blue range, and to increase the numerical aperture to be as close to one as possible. A further possibility is to employ near-field optics in the manner described by Betzig et al. in *Applied Physics Letters*, Vol. 62, pp. 142 (1992), using a tapered fiber with a metal film with a small pinhole at the end. The definition of the system is determined by the size of the pinhole, and can be 50 nm or less. The advantages of the fiber probe system are its excellent definition and its polarization preserving capability which is particularly useful in magneto-optic storage applications. The disadvantages of the system are its poor light efficiency and the fact that it can only observe a single spot at a time, thus limiting its tracking ability when used for optical storage.

Another alternative is to use a solid immersion lens (SIL) between the objective lens and the illuminated object, e.g., an optical recording medium or sample under investigation. The SIL is placed within a wavelength $\lambda$ or less (in the near-field) of the object. Optical systems taking advantage of appropriate SILs are described, e.g., by S. M. Mansfield et al. "Solid Immersion Microscope", Applied Physics Letters, Vol. 57, pp. 2615–6 (1990); S. M. Mansfield et al. "High Numerical Aperture Lens System for Optical Storage", Optics Letters, Vol. 18, pp. 305–7 (1993) and in U.S. Pat. No. 5,004,307 issued to G. S. Kino et al. In this patent Kino et al. teach the use of a high refractive index SIL having a spherical surface facing the objective lens and a flat front surface facing an object to be examined. The use of this SIL enables one to go beyond the Rayleigh diffraction limit in air. In one embodiment, the SIL is employed in a near-field application in a reflection optical microscope to increase the resolution of the microscope by the factor of 1/n, where n is the index of refraction of the SIL.

A paper by G. S. Kino presented at the SPIE Conference on Far- and Near-Field Optics, "Fields Associated with the Solid Immersion Lens", SPIE, Vol. 3467, pp. 128–37 (1998) describes in more detail the principles of operation of two particular SILs. The first is a hemispherical SIL and the second is a supersphere SIL or a stigmatic SIL. The hemispherical SIL improves the effective NA of the objective lens by the refractive index n of the SIL and decreases the spot size by 1/n. The supersphere SIL increases the effective NA of the objective lens by the square of the refractive index $n^2$ and obtains a focus at a distance a/n from the center of the supersphere, where a is the sphere's radius. The spot size is reduced by a factor of $n^2$. The performance characteristics and theoretical limitations of both types of SILs are also discussed.

SILs have found multiple applications. For example, Corle et al. in U.S. Pat. No. 5,125,750 teach the use of a SIL in an optical recording system to reduce the spot size in an optical recording medium. These SILs typically have a spherical surface facing the objective lens and a flat surface facing an optical recording medium. The flat surface is in close proximity to the medium.

In U.S. Pat. No. 5,497,359 Mamin et al. teach the use of a superhemisphere SIL in a radiation-transparent air bearing slider employed in an optical disk data storage system. Lee et al. in U.S. Pat. No. 5,729,393 also teach an optical storage system utilizing a flying head using a SIL with a raised central surface facing the medium. In U.S. Pat. No. 5,881,042 Knight teaches a flying head with a SIL partially mounted on a slider in an optical recording system. This slider incorporates the objective lens and it can be used in a magneto-optic storage system. Finally, in U.S. Pat. No. 5,883,872 Kino teaches the use a SIL with a mask having a slit for further reducing the spot size and thus increasing the optical recording density in an optical storage system, e.g., a magneto-optic storage system.

The prior art SILs as well as the optical systems using them have a number of shortcomings. Hemispherical SILs suffer from back reflection problems. These degrade system performance, especially when the light source is a laser, e.g., a laser diode, and the back reflection is coupled back into the laser. Also, the ray reflected from the spherical surface and the ray reflected from the flat surface or from an object just below the flat surface are coincident. This gives rise to undesirable interference effects.

Superhemispherical SILs have reduced back reflection. However, they demagnify the image of the object by a larger factor than hemispherical SILs. For example, the demagnification of superhemispherical SILs in the axial direction is $1/n^3$. Because of this, the length tolerance for the superhemispherical SIL is very tight. Both the hemispherical and superhemispherical SILs increase the effective NA ($NA_{eff}$) of the objective lens (for hemispherical SIL $NA_{eff} = NA_{objective} \cdot n$; and for superhemispherical SIL $NA_{eff} = NA_{objective} \cdot n^2$. The maximum $NA_{eff}$ that can be obtained by either type of SIL is $NA_{eff} = n$.

Hemispherical, superhemispherical and related SILs experience alignment problems because optical systems employing them require the use of a separate objective lens. This separate lens has to be accurately aligned with the SIL. In many optical systems alignment between these two lenses can not be easily preserved due to external influences (vibrations, stresses, thermal effects etc.). In addition, in systems where the number of parts is to be small, e.g., for weight and size reasons the objective lens is cumbersome.

OBJECTS AND ADVANTAGES

Accordingly, it is a primary object of the present invention to provide a solid immersion lens (SIL) which overcomes the prior art limitations and ensures a small spot size. It is a specific object of the invention to integrate the objective lens and the solid immersion lens. In this manner the misalignment problems between the SIL and the objective lens are eliminated. Optical systems using SILs in accordance with the invention are thus more robust, have a high degree of immunity to misalignments and can be kept small in size.

It is a further object of the invention to provide a SIL which can be used in a flying head or an air-bearing slider of an optical recording system. The head using the SIL in accordance with the invention should be capable of good tracking and scanning performance.

Further objects and advantages will become apparent upon reading the detailed description.

SUMMARY

The objects and advantages of the invention are secured by a solid immersion lens (SIL) having a substantially uniform index of refraction n and having an ellipsoidal surface portion. The ellipsoidal surface portion defines a geometrical ellipsoid with a major axis M, a first geometrical focus $F_1$ and a second geometrical focus $F_2$ separated from the first geometrical focus $F_1$ by a separation $S=M/n$. The SIL has an interface surface portion which passes near or through the second geometrical focus $F_2$. Thus, a collimated light beam propagating along the major axis M and entering the SIL through the ellipsoidal surface portion converges to a focus substantially at the second geometrical focus $F_2$. The interface surface is preferably flat or nearly flat.

The SIL of the invention can have a cut-away portion, e.g., a portion of the ellipsoidal surface portion through which no useful light is passed during operation. This is the portion which is outside the maximum light cone angle of the SIL.

The SIL can have a support portion. Also, the SIL can be made of two or more sections. The refractive indices of both sections should be matched to n as closely as possible to ensure uniformity. Furthermore, the SIL can have a tapered portion.

In addition, the SIL can be provided with a mask on the interface surface. The mask has an opening adjacent the second geometrical focus $F_2$ for further reducing and/or controlling the spot size and/or the polarization of the light passing through the SIL. The dimensions of the opening are substantially less than the wavelength $\lambda$ of the light beam.

An optical system can use the SIL by positioning its interface surface near an object. The system has an arrangement for sending a collimated light beam along the major axis M into the SIL through its elliptical surface portion. The arrangement can use a point-type light source, e.g., a diode laser, a fiber-coupled laser or a fiber laser, and a collimating lens. Thus, light of sufficient intensity can be delivered to the object to alter a property of the object. In the event when light back-scattered or reflected by the object and returning through the SIL is to be examined, the laser can include a self-detection arrangement. Alternatively, a separate detector can be provided to analyze the back-scattered light.

Depending on the application, the object is an optical data recording medium, a magneto-optic recording medium, an optical sample, a photographic film, a semiconductor treated with a photoresist, or any object with a photosensitive or thermosensitive surface that can be altered by light.

The optical system can be further equipped with a polarizing element or elements. These are placed in the path of the light beam. Additionally, a beam steering arrangement such as a movable mirror, e.g., a steerable micro-machined mirror, can be provided for deflecting or steering the collimated light beam before it passes through the ellipsoidal surface portion of the SIL. This is done to shift the focus, as may be necessary during tracking or scanning of the object. The actual "steering" of the beam can also be done before the light is collimated by the collimating lens by moving the virtual point light source transverse to the axis of the collimating lens. This can be done by a "scanning" type mirror or by physically moving the end of the flexible fiber which is emitting light in an optical system where the light is delivered by a fiber. Steering the beam before or after collimation achieves the same results.

When used in a magneto-optic recording system the SIL is mounted in a head which further includes a device, e.g., a coil, for producing a magnetic field within the opto-magnetic recording medium.

The details of the invention are explained in the detailed description in reference to the attached drawing figures.

DETAILED DESCRIPTION

Figure 1:
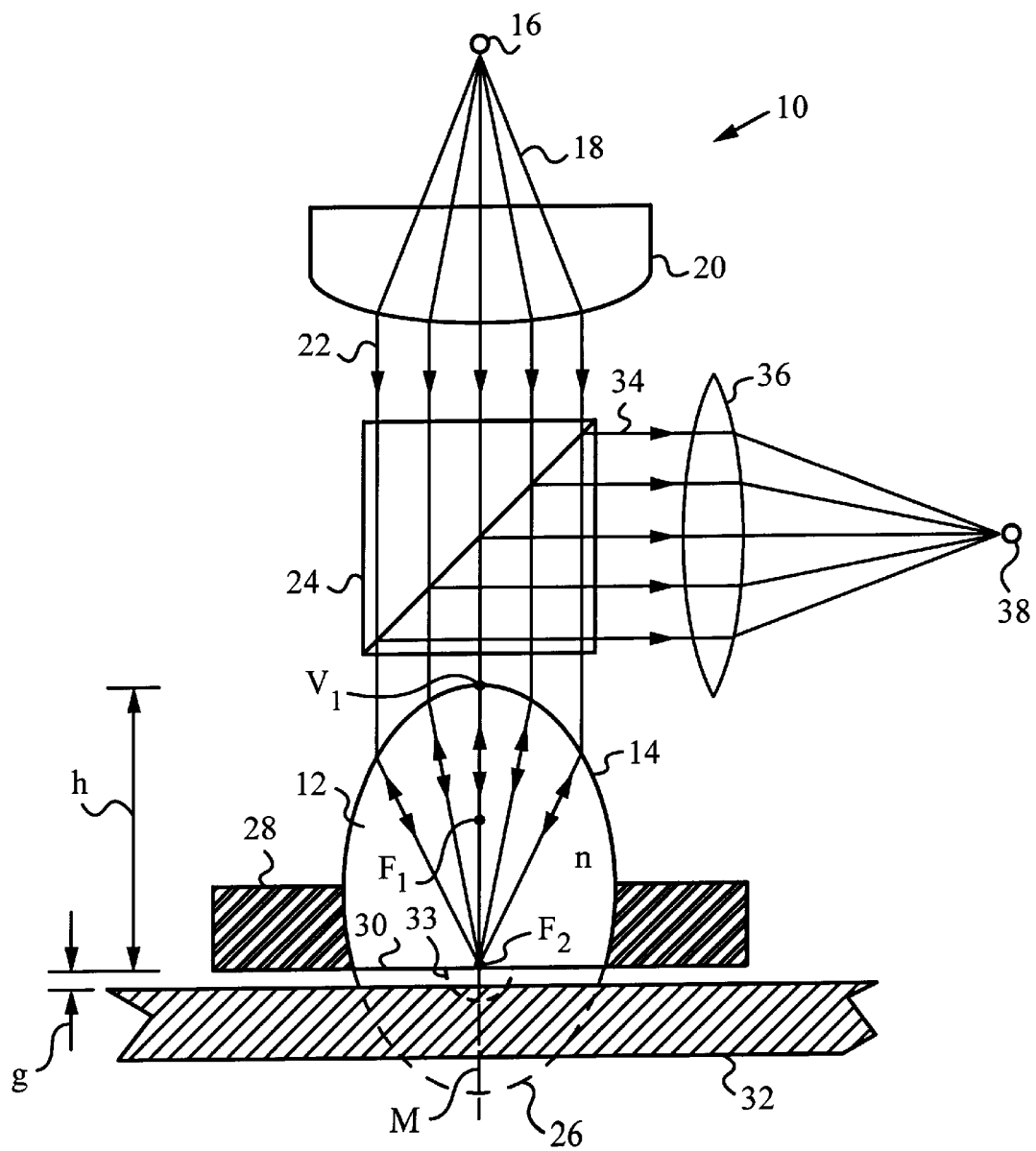
FIG. 1 is a cross sectional side view of an optical system employing a SIL according to the invention.

FIG. 1 illustrates in a cross-sectional side view a general optical system 10 employing a SIL 12 with an ellipsoidal surface portion 14. System 10 has a light source 16 which delivers a diverging light beam 18. A collimating lens 20 is placed in the path of beam 18 to form a collimated light beam 22.

Collimated beam 22 passes through a beam splitter 24 and is incident on the ellipsoidal surface portion 14 of SIL 12. SIL 12 is made of a suitable refractive material, e.g., glass or plastic, having a substantially uniform index of refraction n. SIL 12 is mounted in a support plate 28.

Plate 28 can be made of the same material as SIL 12 or a different material.

In fact, ellipsoidal surface portion 14 defines an entire geometrical ellipsoid 26. The remaining portion of geometrical ellipsoid 26 beyond actual SIL 12 is drawn in dashed lines. Ellipsoid 26 has a major axis M as well as a first geometrical focus $F_1$ and a second geometrical focus $F_2$. Both geometrical foci $F_1$, $F_2$ lie on major axis M.

SIL 12 has a flat interface surface 30 which passes through second geometrical focus $F_2$ of ellipsoid 26 such that geometrical focus $F_2$ itself is contained inside SIL 12. Interface surface 30 should be as close as possible to $F_2$ for best performance. A height h of SIL 12 is thus defined between interface surface 30 or geometrical focus $F_2$ and a vertex $V_1$, at the top of ellipsoidal surface portion 14.

Interface surface 30 of SIL 12 is positioned a distance g above an object 32. Distance g is set at less than a wavelength $\lambda$ of light making up beam 22. In other words, object 32 is placed in the near-field region of SIL 12.

In this embodiment, object 32 is a sample to be examined optically in region 33 of interest. Optical system 10 is a microscope set up to receive a light beam 34 back-scattered or reflected by object 32 upon illumination with beam 22. Back-scattered or reflected beam 34 passes back through SIL 12 and is deflected by beam splitter 24 and focused by a lens 36 to a detector 38. Advantageously, system 10 employs the principles of confocal microscopy well-known in the art.

Figure 2:
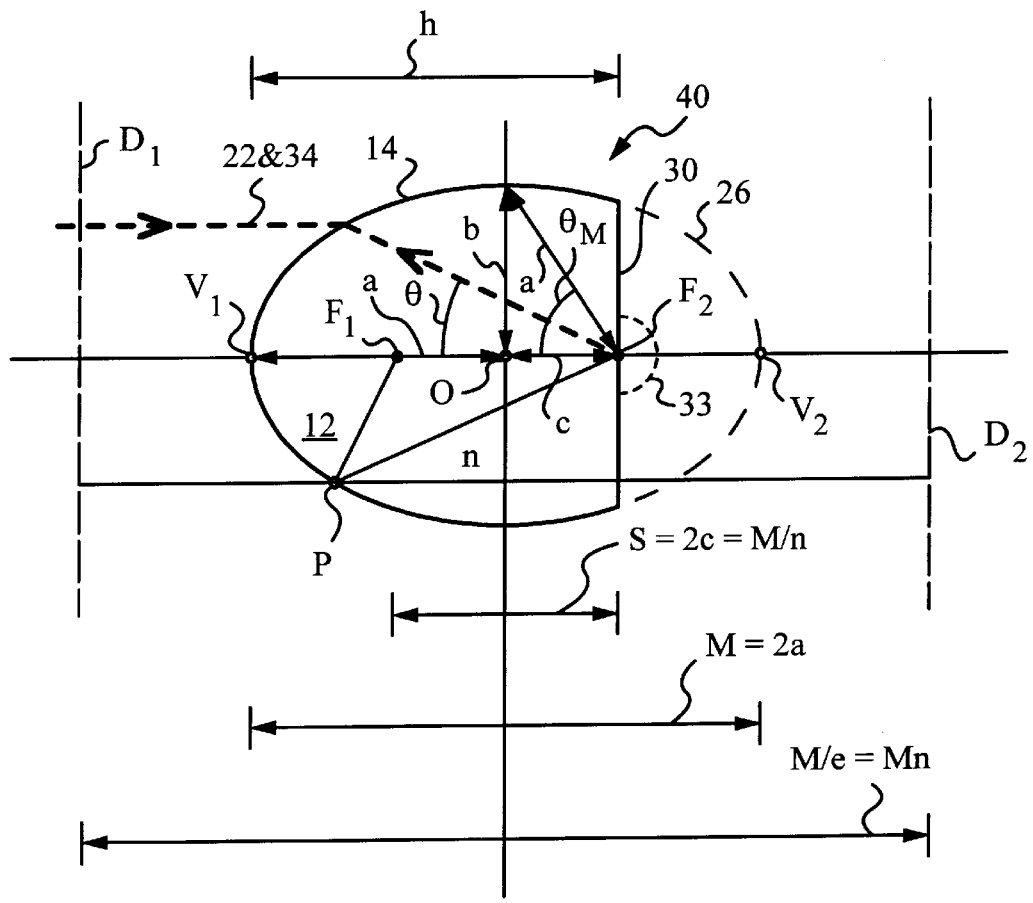
FIG. 2 is a detailed schematic view of the SIL of FIG. 1.

The operation of SIL 12 will be better understood by examining FIG. 2 in which geometrical ellipsoid 26 is shown in cross section along major axis M. The cross section of ellipsoid 26 is an ellipse 40; ellipsoid 26 is generated by revolving ellipse 40 around major axis M. Ellipse 40 is defined in accordance with standard geometrical conventions. In particular, ellipse 40 is defined with the aid of a first directrix $D_1$ and a second directrix $D_2$ as follows:

$$\overline{PF_1} = e\,\overline{PD_1} \text{ and } \overline{PF_2} = e\,\overline{PD_2}$$

where $\overline{PF_1}$, $\overline{PD_1}$, $\overline{PF_2}$, and $\overline{PD_2}$ represent the distances shown in FIG. 2 between point P and focus $F_1$, directrix $D_1$, focus $F_2$, and directrix $D_2$, respectively, and where e is the eccentricity of ellipse 40. Eccentricity e is defined as:

$$e \equiv \frac{c}{a} = \frac{\sqrt{a^2 - b^2}}{a}.$$

The distance from the center O of ellipse 40 to either focus $F_1$, $F_2$ is c and a separation S between foci $F_1$, $F_2$ is thus equal to 2c (S=2c). The length of major axis M is equal to 2a and the distance between directrices $D_1$, $D_2$ is equal to M/e.

In accordance with the invention, refractive index n of SIL 12 is selected such that separation S between foci $F_1$, $F_2$ is equal to the length of major axis M divided by refractive index n, in other words S=2c=M/n. Under this condition collimated light beam 22 propagating parallel to major axis M and entering SIL 12 through ellipsoidal surface portion 14 is focused at second geometrical focus $F_2$. Also, light 34 back-scattered at geometrical focus $F_2$ returns through SIL 12 along the path traversed by beam 22. In fact, light 34 back-scattered in near-field region 33 of geometrical focus $F_2$ returns substantially along the same path as beam 22 and is used for imaging object 32. Both evanescent and plane waves can be involved in the back-scattering process. For a theoretical description of the fields in the near-field region of a SIL see G. S. Kino, SPIE Conference on Far- and Near-Field Optics, "Fields Associated with the Solid Immersion Lens", SPIE, Vol. 3467, pp. 128–37 (1998).

It will be appreciated by a person skilled in the art that present design of SIL 12 integrates the function of objective lens and the SIL as used in prior art systems. In other words, SIL 12 is actually an integrated objective and SIL lens. The effective NA, $NA_{eff}$, and the maximum effective NA, max. $NA_{eff}$, can both be expressed in terms of index n of SIL 12 as follows:

$$NA_{eff} = n \sin \theta$$

$$\max. NA_{eff} = n \sin \theta_M = \sqrt{n^2 - 1}$$

The design parameters of SIL 12 are advantageously expressed in terms of refractive index n. Table 1 gives the design parameters for several particular choices of index n of SIL 12. The design parameters are expressed in terms of n as well as in terms of lengths a, b and eccentricity e.

TABLE 1

| n | $\sqrt{n^2 - 1}$ max. $NA_{eff}$ | $\sqrt{n^2 - 1/n}$ b/a | 1/n e | $\lambda/2 \cdot NA_{eff}$ spot size at $\lambda = 400$ nm |
|---|---|---|---|---|
| 1.5 | 1.118 | .745 | .667 | 170 nm |
| 2.0 | 1.732 | .866 | .500 | 115 nm |
| 2.5 | 2.291 | .917 | .400 | 87 nm |
| 3.0 | 2.828 | .943 | .333 | 70 nm |
| 3.5 | 3.354 | .958 | .286 | 59 nm |

Although in the above embodiment SIL 12 is used in microscope 10 it can be implemented in any other optical system requiring small spot size, high resolution and mechanical stability obtained by virtue of eliminating the objective lens. Several alternative designs of a SIL in accordance with the invention and adaptable to different optical systems and applications are illustrated in FIGS. 3A–C.

Figure 3A:
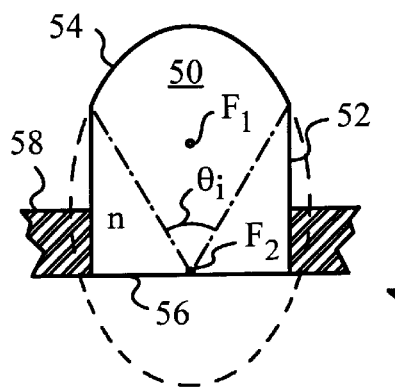
FIGS. 3A–C are cross sectional side views illustrating alternative SILs according to the invention.

FIG. 3A shows a SIL 50 with a cut-away portion 52 along its side. SIL 50 is mounted on its side in a support 58 which holds SIL 50 at cut-away portion 52. Thus, an ellipsoidal surface portion 54 of SIL 50 does not extend to an interface surface 56. However, ellipsoidal surface portion 54 subtends an angle $\theta_i$ which includes the maximum cone angle of useful light. Light outside angle $\theta_i$ includes outer rays which are not generally useful. It should be noted that angle $\theta_i$ can be larger than the well-known critical angle $\theta_c$ for total internal reflection (TIR) at interface surface 56, since energy can be coupled into the object being examined (e.g., object 32) through the evanescent fields when the object is in the near-field of SIL 50.

Figure 3B:
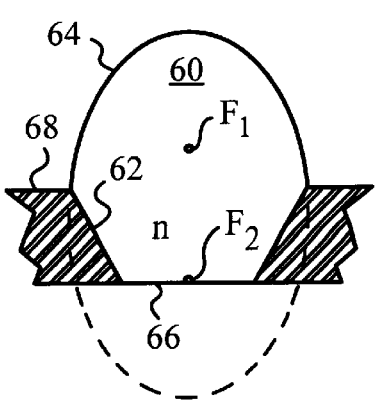

FIG. 3B illustrates a SIL 60 with a tapered portion 62 seated in a support 68. An ellipsoidal surface portion 64 of SIL 60 extends to tapered portion 62. In turn, tapered portion 62 terminates at an interface surface 66.

Figure 3C:
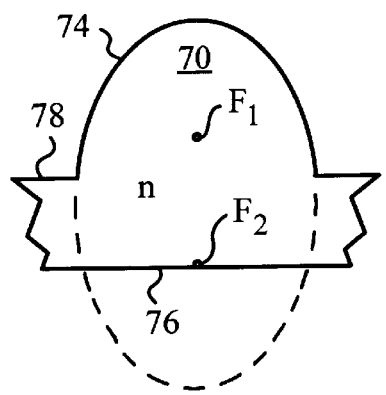

FIG. 3C shows a SIL 70 with a support portion 78 integral with and made of the same material as SIL 70 itself. In fact, SIL 70 and support portion 78 are advantageously molded as one part. In this embodiment an ellipsoidal surface portion 74 of SIL 70 terminates at support portion 78. A section of the bottom surface of support portion 78 constitutes an interface surface 76 of SIL 70.

Figure 4:
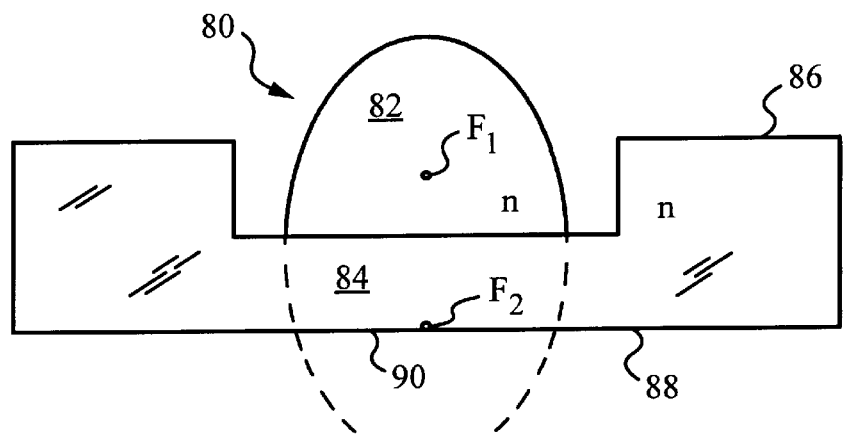
FIG. 4 is a cross sectional side view illustrating another embodiment of a SIL according to the invention.

FIG. 4 illustrates a SIL 80 made of two sections 82, 84. The refractive indices of sections 82, 84 are both equal to n in order to ensure index uniformity throughout SIL 80. First geometrical focus $F_1$ of SIL 80 is located in section 82, while second geometrical focus $F_2$ is located in bottom section 84.

Bottom section 84 extends beyond SIL 80 and forms a support structure 86 for SIL 80. Section 84 has a bottom surface 88, a portion of which constitutes an interface surface 90 of SIL 80. This embodiment can be advantageously employed in optical flying heads or air-bearing sliders. In fact, bottom surface 88 can be the air bearing surface of a slider equipped with SIL 80.

Figure 5:
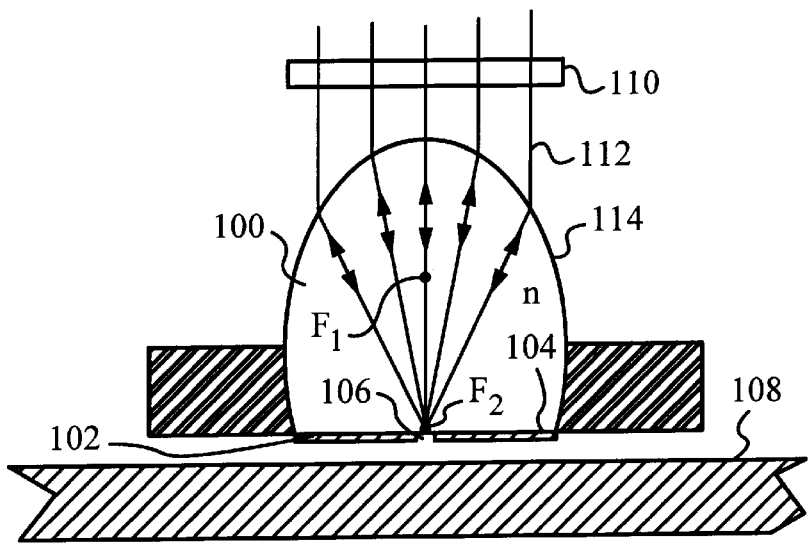
FIG. 5 is a cross sectional view of a portion of an optical system employing a polarizer and a SIL with a mask in accordance with the invention.

FIG. 5 shows a SIL 100 having a mask 102 deposited on an interface surface 104. Mask 102 has an opening 106 directly below second geometrical focus $F_2$ of SIL 100. Opening 106 has dimensions smaller than the wavelength $\lambda$ of light used and defines the extent of evanescent fields coupled out of SIL 100 to an object 108. The use of mask 102 with opening 106 allows one to further reduce the spot size, as is known in the art.

A light beam 112 incident on an ellipsoidal surface portion 114 of SIL 100 is passed through a polarizer 110. Polarizer 110 can be positioned at any location in an optical system employing SIL 100. For example, polarizer 110 can be interposed between any collimating lenses and/or beam splitters (not shown). The purpose of polarizer 110 is to adapt SIL 100 for using one polarization of light 112 only, as required in some applications. For example, one polarization is used in magneto-optic data storage systems, i.e., when object 108 is a magneto-optic recording medium.

Figure 6A:
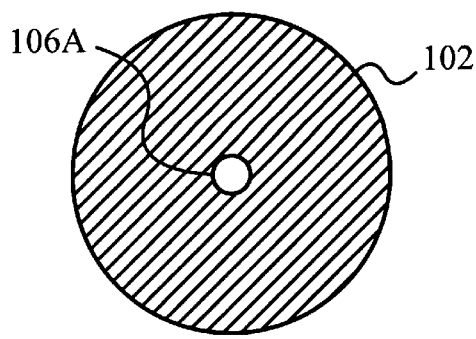
FIGS. 6A–B are plan views of alternative masks.
Figure 6B:
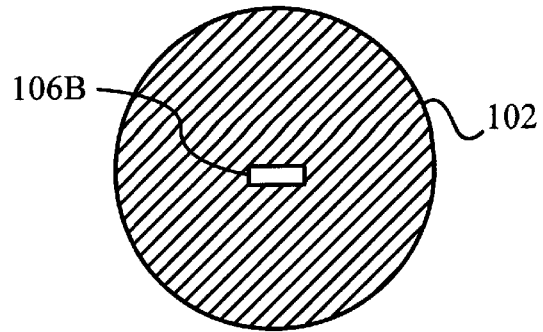

FIGS. 6A and 6B illustrate two alternative masks 102 which can be used with SIL 100. In FIG. 6A mask 102 has a circular opening 106A. In FIG. 6B, mask 102 has a slit-shaped opening 106B. Circular opening 106A is used when polarization independence is desired. Slit-shaped opening 106B is used when operating with only one linear polarization of light.

Figure 7:
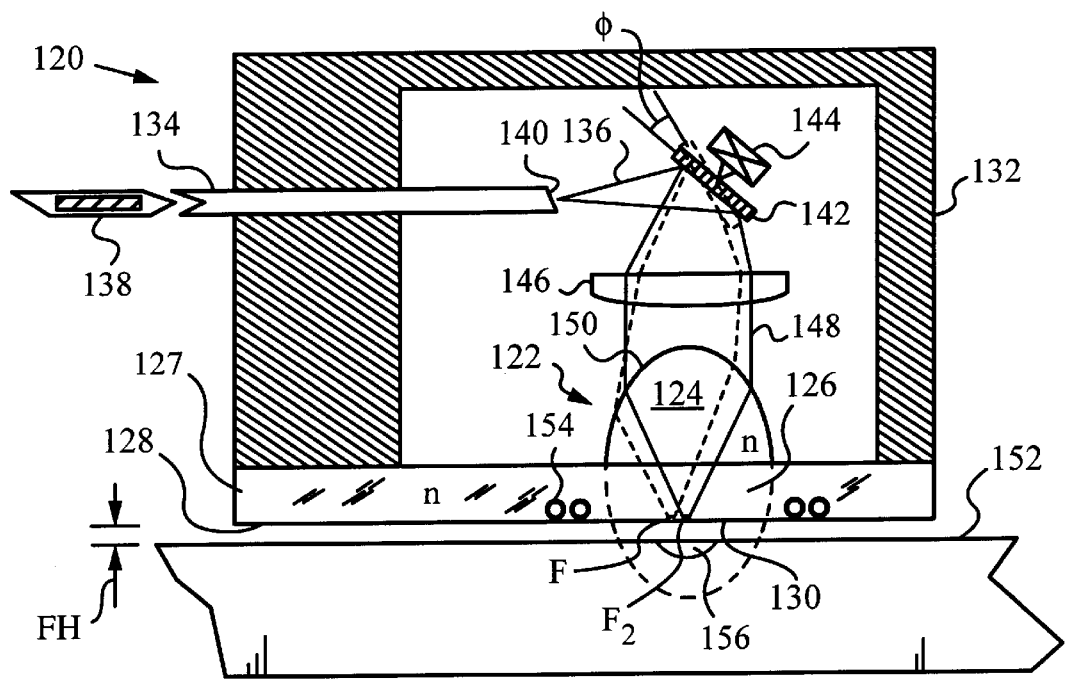
FIG. 7 is a cross sectional side view of a optical recording head utilizing a SIL according to the invention.

FIG. 7 shows a head 120 for use in a magneto-optic recording system employing a SIL 122 according to the invention. SIL 122 has two sections 124 and 126. Section 126 is part of a bottom piece 127 of head 120. Bottom piece 127 has an air-bearing surface 128. A portion of air bearing surface 128 forms an interface surface 130 of SIL 122.

Head 120 has a housing 132 for receiving an optical fiber 134 which delivers optical signals in a light beam 136 generated by a laser 138, in this case a fiber laser. An output facet 140 of fiber 134 emits beam 136 which diverges and is reflected by a steerable mirror 142 controlled by a control mechanism 144. For example, mirror 142 can be a steerable micromachined mirror with an electronic control, as is known in the art (see U.S. Pat. No. 5,872,880 to Maynard).

Air bearing surface 128 is positioned above a magneto-optic medium 152, e.g., a magneto-optic disk. During operation a flying height FH is maintained by the air flow squeezed between air bearing surface 128 and disk 152, as is known in the art. Flying height FH is kept at a value smaller than the wavelength $\lambda$ of light in beam 136. In other words, medium 152 remains in the near-field of SIL 122.

Light beam 136 is collimated by a collimating lens 146 to form a collimated light beam 148. Collimated beam 148 is incident on an ellipsoidal surface portion 150 of SIL 122 and is focused at second geometric focus $F_2$ of SIL 122. Data is written in a near-near field region 156 in medium 152. A mechanism 154, e.g., a coil for creating the requisite magnetic field is embedded in bottom piece 127 of head 120 around SIL 122.

By rotating mirror 142 with the aid of control mechanism 144 the path of reflected beam 136 can be altered resulting in steering of collimated beam 148 at an angle to the axis of SIL 122. For example, tilting mirror 142 by an angle $\phi$ of approximately +/−2 degrees as shown in dashed lines can result in a lateral displacement of the focus of beam 148 by several spot diameters away from geometrical focus $F_2$. The field of view of SIL 122 can be made sufficiently large to permit moving focus laterally several spot diameters to follow a data track or to seek from one data track to another data track in medium 152. Consequently, fine-scanning or tracking operations can be performed by head 120 equipped with SIL 122. (Coarse-scanning or tracking can be performed by moving entire head 120 across the disk data tracks, as is known in the art, see, e.g., U.S. Pat. No. 5,903,525). A person of average skill in the art will recognize that, as in any type of lens, off-axis aberrations will limit the field of view as the effective NA of SIL 122 is increased.

It should be noted that a mask similar to mask 102 can be used on interface surface 130. However, the field of view of SIL 122 will be reduced by the mask and therefore the tracking ability of head 120 will also be decreased.

Since SIL 122 does not require a separate objective lens, the size and weight of head 120 can be kept small. Furthermore, head 120 is more immune to optical misalignments brought about by vibration and other mechanical disturbances.

Of course, the SIL of the invention, which can also be called an ellipsoidal SIL (ESIL) can be used in applications which are not near-field. In fact, there are two cases of ESIL use, depending on the NA. When NA<1 then the rays are within the critical angle $\theta_c$ for total internal reflection (TIR) and the fields can propagate in the gap between the ESIL and the object. In this case the distance between the interface surface of the ESIL and the surface of the object can be large in comparison to the wavelength $\lambda$ of light used. When NA>1, then the fields fall off exponentially in the gap and the distance between the ESIL and the object has to be less than the wavelength $\lambda$.

Figure 8:
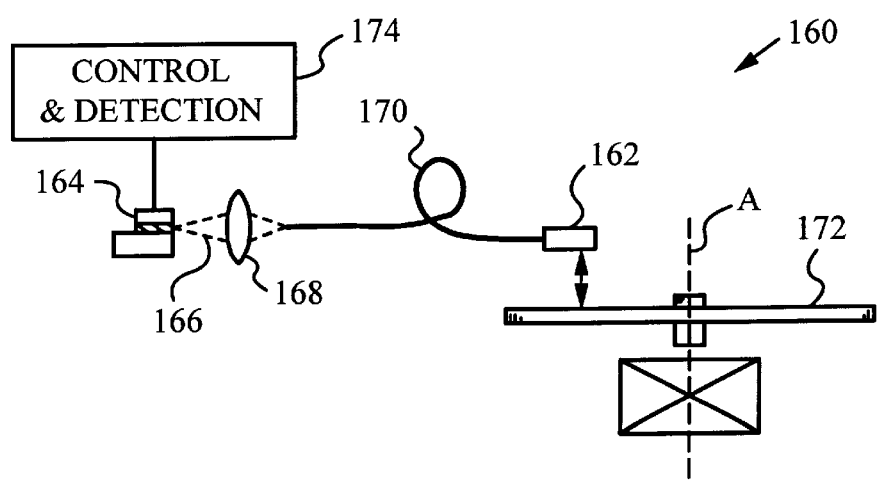
FIG. 8 is a schematic diagram illustrating an optical recording system.

FIG. 8 illustrates an optical storage system 160 employing a head 162 equipped with an ESIL according to the invention (not shown). System 160 uses a diode laser 164 for emitting light beam 166 and a lens 168 to focus and couple beam 166 into a single-mode optical fiber 170. Fiber 170 delivers beam 166 to head 162 where it is collimated and passed through the ESIL, as described above to store and/or retrieve optical information from an optical disk 172. For applications in which disk 172 is a magneto-optic type disk fiber 170 can be a polarization-maintaining optical fiber.

ESIL has very low back-reflection and thus does not reflect much noise or cause interference to be coupled back into laser 164. Thus, an integrated control and detection 174 using laser diode in a self-detection mode is used to analyze the light scattered from disk 172. In other words, laser self-detection is employed for reading the data from disk 172. For more information on laser self detection see U.S. Pat. No. 5,887,009.

Figure 9:
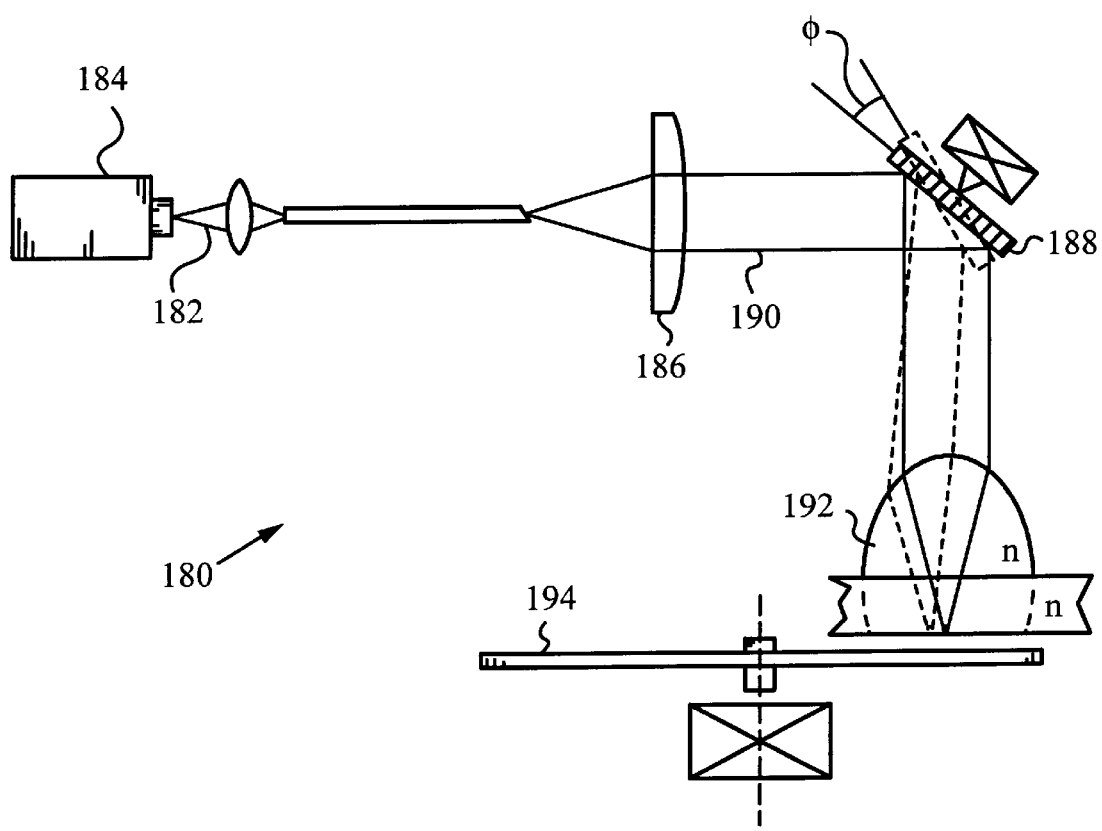
FIG. 9 is a schematic diagram illustrating another optical recording system using a SIL according to the invention.

FIG. 9 illustrates yet another optical recording system 180 in which a light beam 182 provided by a laser 184 is first collimated to a collimated beam 190 by collimating lens 186 before being reflected by a steerable mirror 188. After reflection beam 190 propagates to an ESIL 192 which is positioned above an optical disk 194.

The advantage of this arrangement is that collimated beam 190 is deflected by twice the angle ($2\phi$) by which mirror 188 is rotated. This allows to further reduce the size of the system and take full advantage of the size and weight advantages of ESIL 192.

An ESIL according to the invention can be made, for example, by first determining the refractive index n of the optical material and then the height h of the ESIL. The ESIL is then formed in its entirety as a solid of revolution about the major axis. The length of major axis M is derived from height h since $M=2h/(1+e)$. In a final step the ESIL is polished to produce an interface surface passing through second geometrical focus $F_2$ of the ESIL.

The above embodiments are presented to illustrate the present invention and are not to be construed as limitations thereof. Accordingly, the scope of the invention should be determined by the following claims and their legal equivalents:

What is claimed is:

1. A solid immersion lens having a substantially uniform index of refraction n and comprising:
   a) an ellipsoidal surface portion defining a geometrical ellipsoid having a major axis M, a first geometrical focus $F_1$, a second geometrical focus $F_2$ separated from said first geometrical focus $F_1$ by a separation S=M/n;
   b) an interface surface portion passing substantially through said second geometrical focus $F_2$;
   such that a collimated light beam propagating along said major axis through said ellipsoidal surface portion converges to a focus substantially at said second geometrical focus $F_2$.

2. The solid immersion lens of claim 1, further comprising at least one cut-away portion.

3. The solid immersion lens of claim 2, wherein said cut-away portion is outside a maximum light cone angle of said solid immersion lens.

4. The solid immersion lens of claim 1, further comprising at least one support portion.

5. The solid immersion lens of claim 1, comprising at least two sections.

6. The solid immersion lens of claim 1, further comprising a tapered portion.

7. The solid immersion lens of claim 1, wherein said interface surface is substantially flat.

8. The solid immersion lens of claim 1, further comprising a mask on said interface surface, said mask having an opening adjacent said second geometrical focus $F_2$.

9. The solid immersion lens of claim 8, wherein the dimensions of said opening are substantially less than the wavelength of said light beam.

10. An optical system comprising:
  a) a solid immersion lens having a substantially uniform index of refraction n and comprising:
    1) an ellipsoidal surface defining a geometrical ellipsoid having a major axis M, a first geometrical focus $F_1$, a second geometrical focus $F_2$ separated from said first geometrical focus $F_1$ by a separation S=M/n;
    2) an interface surface passing substantially through said second geometrical focus $F_2$, such that a collimated light beam propagating along said major axis through said ellipsoidal surface converges to a focus substantially at said second geometrical focus $F_2$;
  b) an object positioned near said interface surface.

11. The optical system of claim 10, wherein said object is less than a wavelength $\lambda$ of said collimated light beam away from said interface surface.

12. The optical system of claim 10, further comprising a means for providing said collimated light beam.

13. The optical system of claim 12, wherein said means comprise a collimating lens.

14. The optical system of claim 12, wherein said means comprise a laser selected from the group consisting of diode lasers and fiber lasers.

15. The optical system of claim 14, wherein said laser comprises a self-detection means.

16. The optical system of claim 12, wherein said means comprise an optical fiber selected from the group consisting of single-mode fibers and polarization maintaining fibers.

17. The optical system of claim 10, wherein said object is selected from the group consisting of optical recording media, magneto-optical recording media, optical samples, photographic films, semiconductors treated with a photoresist, objects with a photosensitive surface and objects with a thermosensitive surface.

18. The optical system of claim 10, further comprising a polarization altering means in the path of said light beam.

19. The optical system of claim 10, further comprising a beam steering means for steering said collimated light beam, thereby shifting said focus.

20. The optical system of claim 19, wherein said beam steering means comprise a steerable micromachined mirror.

21. The optical system of claim 10, further comprising a detection means for detecting a back-scattered light beam gathered by said solid immersion lens.

22. An optical recording system having a head positioned above a recording medium, said head having a solid immersion lens having a substantially uniform index of refraction n and comprising:
  a) an ellipsoidal surface defining a geometrical ellipsoid having a major axis M, a first geometrical focus $F_1$, a second geometrical focus $F_2$ separated from said first geometrical focus $F_1$ by a separation S=M/n;
  b) an interface surface passing substantially through said second geometrical focus $F_2$, such that a collimated light beam propagating along said major axis through said ellipsoidal surface converges to a focus substantially at said second geometrical focus $F_2$.

23. The optical recording system of claim 22, further comprising a beam steering means for steering said collimated light beam, thereby shifting said focus.

24. The optical recording system of claim 23, wherein said beam steering means comprise a steerable micromachined mirror.

25. The optical recording system of claim 22, wherein said recording medium is an opto-magnetic recording medium and said optical recording system further comprises a means for producing a magnetic field within said opto-magnetic recording medium.

26. The optical recording system of claim 22, further comprising a means for providing said collimated light beam.

27. The optical recording system of claim 26, wherein said means comprise a collimating lens.

28. The optical recording system of claim 26, wherein said means comprise an optical fiber selected from the group consisting of single-mode fibers and polarization maintaining fibers.

29. The optical recording system of claim 22, wherein said head is a flying head.

* * * * *